United States Patent
Stiawa et al.

(10) Patent No.: US 6,578,927 B1
(45) Date of Patent: Jun. 17, 2003

(54) METHOD AND DEVICE FOR PRODUCING BRUSH PRODUCTS

(75) Inventors: Paul Stiawa, Berlin (DE); Bernd Hoeft, Berlin (DE); Udo Ruediger, Berlin (DE)

(73) Assignee: Schlesinger Maschinenbau GmbH, Burgwald (DE)

( * ) Notice: Subject to any disclaimer, the term of this patent is extended or adjusted under 35 U.S.C. 154(b) by 0 days.

(21) Appl. No.: 09/530,456
(22) PCT Filed: Oct. 26, 1998
(86) PCT No.: PCT/DE98/03166
§ 371 (c)(1),
(2), (4) Date: Apr. 28, 2000
(87) PCT Pub. No.: WO99/22623
PCT Pub. Date: May 14, 1999

(30) Foreign Application Priority Data

Oct. 30, 1997 (DE) .......................... 197 48 925
Nov. 28, 1997 (DE) .......................... 197 54 762

(51) Int. Cl.[7] .................................. A46D 3/00
(52) U.S. Cl. .................. 300/2; 300/17; 300/21
(58) Field of Search .................. 300/2, 17, 21

(56) References Cited

U.S. PATENT DOCUMENTS 2,643,158 A * 6/1953 Baldanza .................. 300/21
2,655,409 A   10/1953 Baldanza .................. 300/21
3,408,112 A   10/1968 Piotrowski ................. 300/21
3,610,692 A * 10/1971 Van der Molen ........... 300/21
4,749,233 A    6/1988 Weihrauch ................. 300/21

FOREIGN PATENT DOCUMENTS

| DE | 845 933     |   | 7/1949  |           |
|----|-------------|---|---------|-----------|
| DE | 1 554 925   |   | 6/1972  |           |
| DE | 160 46 73   |   | 10/1972 |           |
| DE | 293 718 A5  |   | 10/1983 |           |
| DE | 4439431     |   | 5/1996  |           |
| EP | 0 142 885 A2|   | 5/1985  |           |
| EP | 0 149 996 A2|   | 7/1985  |           |
| FR | 1462272     | * | 11/1966 | ... 300/21|

* cited by examiner

Primary Examiner—Mark Spisich
(74) Attorney, Agent, or Firm—Michael J. Striker

(57) ABSTRACT

A multi-stage injection molding method for the brush body is proposed in the first injection stage of which sealing of the bores of the bottom plate of the injection molding tool, including the tips of the cords of bristles that protrude into the mold interior is performed, and with the opening of the injection molding tool, a zone of rigidly fastened cords of bristles is created between the brush body, fastened in the intermediate plate, and the bottom plate, so that the cords of bristles can subsequently be served in the open without a counterpart blade, using a severing knife that swings back and forth, without the need for remachining the cut faces.

10 Claims, 3 Drawing Sheets

METHOD AND DEVICE FOR PRODUCING BRUSH PRODUCTS

BACKGROUND OF THE INVENTION

The invention relates to a method and a device for producing brush products, such as brushes, brooms, artists' brushes and the like, using endless cords of bristles, whose brush bodies are injection molded from plastic, and the bristle sheaves are simultaneously cast integrally in the form of tips of the endless cords of bristles introduced into the mold interior through bores in the bottom plate.

Since the introduction of plastic bristles in the manufacture of brush products, technological solutions for producing these products using endless cords of bristles have been sought.

The so-called "anchor method", which is to be the point of departure as an example below and that continues as before to be employed predominantly in brush production, in which bristle sheaves are stuffed into prefabricated/ predrilled brush bodies with the aid of a bristle stuffing machine and are secured to the bottom of the hole with wire or tiny plate anchors, has many disadvantages.

Not only the very high equipment costs but in particular also questions of quality of the finished products have led to the search for alternative solutions. In mechanically stuffing the bristle sheaves into prepared bores of the brush bodies, for instance, tiny interstices and gaps between the walls of the drilled holes and the filaments of the bristle sheaves, as well as between the filaments of the bristle sheaves themselves, are unavoidable. These interstices and gaps are then favored sites for mildew and the like and promote soiling.

To solve the technological and quality problems, various fundamentally different courses have been taken, such as connecting the ends of the bristles and the corresponding bores in the brush body by fusing or melting, or, in a particularly rational solution, directly embedding the ends of the bristles in the plastic brush body at the same time the brush body is made in an injection mold.

It has also been proposed that the tips of bristle cords be passed through bores in the bottom plates of an injection molding tool into the mold interior for the brush body and jointly sheathed in this brush body in a single operation in the injection molding.

The most difficult, and until now practically unsolved, problem in embedding the bristle ends in the course of the injection molding of the brush body is the reliable avoidance of overshooting as a result of the bores in the bottom plate of the injection mold that are needed for introducing the cords of bristles into the mold interior.

By a known method disclosed in East German Patent Disclosure DD 293 718 A5, bristle sheaves of endless bristle cords of plastic are used for brush goods, in that the tips of the cords are passed through bores in the bottom plates of the injection molding tool into the mold interiors and simultaneously jointly injected into the brush body without further machining in the injection molding of the brush body.

These method proposals state that overshooting of the composition could be avoided with the aid of conical bores, tapering toward the mold interior, in the bottom plate that terminate cylindrically, allowing a slight pressure of the cords of bristles to be attained. Many practical tests, however, have shown that this cannot effectively, in terms of equipment and/or process technology, counteract the tendency of the injection molding composition, as a function of the injection pressure and the degree of the temperature-dependent viscosity, to escape to the outside during the injection molding process between the filaments of the cords of bristles and between the cords of bristles and the walls of the bores. Furthermore, even the slightest escapes of the composition in the case of conically shaped bores leads to the immediate formation of plastic plugs in these bores, which quite effectively prevent the cords of bristles from being pulled through the bores in the bottom plate in the final molding, and as a rule this causes interruptions in production with sometimes severe underinjections on the bottom plates of the injection molding tools. With the provisions proposed in these methods, the problems of reliable avoidance of overshooting during the injection molding process cannot be solved.

One method for producing brush bodies with a bristle field for toothbrushes, the brush bodies being formed in some regions of at least two plastic components, is known from German Patent Disclosure DE 44 39 431 A1. In this method, bristle sheaves already cut to the proper length and assembled into bristle fields and located in a bristle mount are injected jointly with the production of the brush body in a first operation. In other words, the use of endless cords of bristles is not the point of departure. Nor does this reference show how the bristle sheaves are introduced with frictional engagement into the bristle mount, whose assembly is supposed to be done outside the tool in separate operations. In particular, it does not show how the intrusion of injection molding composition into the bores of the bristle mount, which could occur despite the frictionally engaged packing of the bristle sheaves, should be prevented. For the reasons given, this method is again unable to solve the problems described.

A further major problem in producing brush products using endless cords of bristles is severing the cords of bristles after the conclusion of the injection molding process in conjunction with furnishing the requisite bristle lengths for the next injection molding operation, inside an automated, continuous production sequence.

In DD 293 718 A5, the severing of the finished brush products from the cords of bristles that remain in the bores of the bottom plate of the injection molding tool is done in the open. To that end, after the brush bodies have cooled down, the upper part and a framelike middle part of the injection molding tool is lifted, along with the hardened brush body, from the bottom plate and in the process the cords of bristles are pulled to the required lengths through the bores in the bottom plate. The brush body is lifted from the bottom plate with the aid of an intermediate plate. Further details on the manner and function of the severing device and on the creation of further required cutting conditions for severing the bristle cords in the open without a supporting cutting edge are not disclosed in this proposal, however.

So far, attempts to sever the cords of bristles under the aforementioned preconditions, whether with rotating knives or reciprocating knives, without a supporting cutting edge have failed. Many filaments of the cords of bristles to be severed are pulled through the bore of the bottom plate during the severing process, resulting in unstable cutting conditions. The method presented cannot solve the existing problems, for the reasons given.

From German Patent DE-PS 845 933, the severing of toothbrushes with the injection molding tool open, using a rotating severing disk, is known; during the severing process, the toothbrushes are not firmly held stably, for instance by means of an intermediate plate or some other holding device. Severing the finished brush products from the bristle fields without establishing a stable position of the brush body, as proposed in this reference, is extremely difficult because of the actual events that occur in such severing processes. The lack of a stable position of the brush bodies during the severing process makes the possibility of a severing cut over the entire bristle field highly doubtful. Furthermore, during the severing operation, the brush bodies can be torn by force out of their positioning and tumbled about in the tool, making stable production sequences in fact impossible.

Serving by means of a rotating severing disk is problematic for two reasons in particular, without addressing the aforementioned inadequacies at all. First, a cut in the same direction results in persistent forces of friction and tension in its direction of motion. These forces are transmitted by the rotary motion of the severing disk to the cords of bristles to be severed and to their individual filaments, creating relatively strong tensile forces and forces tending to rip the bristles out. As a rule, this causes bristles and bristle sheaves to be torn out of the brush body and causes cords of bristles to be pulled out of the bores of the bottom plate of the injection molding tool through which the bristle cords of the bristle field have been passed.

On the other hand, the high rotary speed of the severing disk, with an increasing penetration depth, generates higher friction with an increase in the resultant heat of friction. This causes melting at the interfaces of the cords of bristles and sticking on the severing disk. Tests have shown that it is hardly possible to avoid these phenomena, even by undercutting the severing disk. Once again, for the reasons given, this method cannot solve the existing problems.

SUMMARY OF THE INVENTION

The object of the invention is to develop a method and a device for producing brush products of the type defined at the outset that without additional provisions reliably avoids overshooting in the region of the bristle sheaves and assures stable securing of the bristles in the brush body and after the conclusion of the injection molding process, furnishing the requisite bristle lengths for the next injection molding process, assures severing of the bristle field of the finished injection molded brush product in the open without requiring remachining.

The method of the invention assures that the demands made of a high-quality brush product, such as a smooth, flat bottom face and intimate sheathing of the injected bristle ends in a way that is materially bonded as tightly as possible, thereby stably fastening the bristles in the brush body, are met. A prerequisite for attaining the stated object and reaching the aforementioned goal is the lowest possible viscosity of the injection molding composition and the highest possible pressure, in order to attain the highest possible injection speed and to avoid heat losses. According to the invention, this is attained in that in the first stage of the multistage injection molding process that accomplishes the sealing, plastic composition is introduced into the mold interior at a speed of over 100 mm/s and a pressure of over $1.5 \cdot 10^8$ Pa.

The avoidance of overshooting, despite the high injection pressure and the high injection speed, is attained according to the invention in that in the first stage, only just enough plastic composition so that the bottom plate, including the entire bristle field is covered with it, but without filling the mold interior completely.

With these parameters, and expediently in terms of equipment supplemented with a heating conduit as well, undesired cooling down of the injection molding composition in the first injection stage, until the composition arrives at the bristle field, is averted without any substantial head pressure being able to build up in the mold interior.

The high injection pressure in the first stage is thus purely theoretical in nature and corresponds only to the high injection speed but does not lead to an undesired build up of pressure in the mold interior.

If this first injection of composition meets the cooled or tempered bottom plate in the mold interior, then as a result of the immediate temperature loss, a thin layer of composition that directly touches the bottom plate leads to sealing of the perforated bottom plate. This sealing is propagated, with a slight time lag, to the bristle cords where they emerge from the bores of the bottom plate.

This layer that brings about the sealing, which initially is very thin, especially in the region of the cords of bristles, and accordingly is also very vulnerable, can, however, be utilized up to a certain pressure range as an adequate barrier, at the transitions of the cords of bristles to the bores of the bottom plate, to the incoming injection molding composition in the subsequent injection stages.

It is significant according to the invention that in the first stage, only as much composition as is needed to seal the bottom plate and to reach the requirements in terms of the quality of adhesion and location of the bristle sheaves is injected. As a result, on the hand a heat buildup on the bottom plate from incoming injection molding composition can be kept within limits, and on the other, an increasing sealing effect at the surface of the bottom plate from the heat energy dissipated from the layer of composition near the bottom can be attained faster.

In order to make maximum use of the increasing sealing effect, the course of injection has been prolonged chronologically, so that in accordance with the tests performed, the final injection stage in which the mold interior of the tool is filled has been placed in a range of about 2.5 to 9 seconds after the onset of injection.

The buildup of a head pressure even before the mold interior of the injection molding tool is completely filled by incoming injection molding composition entering at high speed, is made more difficult or prevented according to the invention by a reduction of the injection pressure to values below $4 \cdot 10^7$ Pa, in combination with a reduction in the injection speed. In order to utilize the plastic behavior of the peripheral zones of the filaments of plastic bristle material at high temperatures for a connection between the brush body and the cords of bristles that is in part created not only by positive engagement but also by material engagement, according to the invention the temperature of the injection molding composition for the brush body is selected in ranges that are approximately in very high ranges and above the flow temperature (FT) or the crystallite melting temperature (KT) (pertaining to crystalline or partly crystalline polymers) of the bristle material.

For instance, bristle material of polyamide 6 (PA 6), which has a high KT of 265° C., is combined for the brush body with polypropylene (PP), which has a KT of only 165° C. With an injection temperature of the PP of 10° C. above the KT of the PA 6, good results have been attained with respect to the quality of the end product, and overshooting has been precluded, even though in these temperature ranges, polypropylene has an extremely low viscosity.

Thus because of the recrystallization of the polyamide 6, it is additionally attained that the bristle sheaves, after unmolding of the brush body, stand rigidly upright and tightly bundled, in exact agreement with their position in the bores of the bottom plate during the injection molding process. Furthermore, by utilizing the shrinkage parameters (up to 2% for polypropylene), a further adhesion effect of the bristle sheaves in the brush body is attained.

As experiments have shown, with this injection molding technique, the tendency to overshooting in the region of the cords of bristles has been successfully prevented in a simple, without extensive additional effort and expense for technology. Special pressings of the bristle sheaves in the bores of the bottom plate are not needed either to achieve this effect.

After the conclusion of an injection molding process and after reaching the opening position of the injection molding tool, the bristle field is clamped again immediately by the double plates of the bottom plates; the intermediate plate firmly holds the brush bodies stably counter to the traction direction of the cords of bristles, and as a result a zone of rigidly tensed cords of bristles is created between the brush body and the bottom plate, and in this zone the cutting operation is effected utilizing only the tension of the cords of bristles and the internal rigidity of the bristle filaments. The cord of bristles tensed rigidly in this way is severed, taking into account the requisite bristle length for the ensuing injection operation, with the aid of a severing knife that swings back and forth, without any counterpart blade. By using the bottom plate embodied as a double plate, the clamping of the bristle field and the unclamping are attained without problems for the entire bristle field with the technologically required scope.

By using a reciprocating flat severing knife, the buildup of persistent pressure and tearing out forces that act on the bristle clusters in one direction is avoided. The development of the heat of friction when the bristle fields are severed is also greatly reduced, compared to a severing disk operating at a high rate of revolution, because of the substantially lower cutting speed of the flat severing knife, and because of the low frictional area of this knife, and thus the severing process is practically unimpaired.

To allow the intermediate plate to hold the brush body firmly and stably, its contours should be designed with the aid of bevels and/or steps in such a way that when the injection molding tool is opened, the brush bodies are lifted by this plate to the predetermined height yet can nevertheless be ejected in the direction of the cover plate after the bristle field is severed.

This has the advantage that on the one hand because of the wide engagement areas of the intermediate plate, relatively high tensile forces for lifting from the bottom plate can be transmitted to the contours of the brush body substantially more gently to the cooled brush body than if ejector mandrels are used. Thus the cords of bristles of the bristle field are pulled through the bores in the bottom plate, which are opened for this time, without impairing the surface of the brush body. On the other hand, as a result the severed brush products can be ejected once the bristle field has been severed.

An advantageous embodiment is defined by claim 9. In the teaching of claim 9, the cover plate of the tool is moved upward in the opening motion, past the intermediate plate, far enough that after the severing operation, the finished brushes are ejected from the intermediate plate by the ejector mandrel without difficulty, and without leaving notches behind in the direction of the cover plate.

In the further embodiment of the invention, it is provided that the requisite preconditions for the successful use of the severing device in the severing process are created, which serve to establish more stable cutting conditions for the flat severing knife moving back and forth crosswise to the cutting direction.

To that end, it is necessary to determine the most favorable spacing of the sectional plane of the severing knife from the bottom plate. This is achieved by placing the sectional plane of the severing knife at a distance from the bottom plate that while overcoming the relatively high cutting resistance that is presented to the severing knife by the cords of bristles still allows utilizing the internal rigidity of the cords of bristles. This distance is defined by the internal rigidity of the bristle material, the diameter of the filaments, the thickness of the bristle cords, and the stable guidance of the cords of bristles in the bores of the bottom plate and is ascertained empirically. Findings thus far show that this distance is between 2 and 3 times the diameter of the cords of bristles.

A further precondition for the successful severing process is mastering the problem that the individual filaments of the cords of bristles, depending on their position, that is, whether they are located on the periphery or in middle positions of the cords of bristles, are held variably firmly in the bores of the bottom plate.

Depending on their position inside the cords of bristles, the filaments react differently to the tensile forces occurring in the cutting operation. This behavior has a definitive influence on the design of the cutting process.

When the cords of bristles are clamped in the bottom plate, the filaments located on the outside of the bore in the clamping direction are fixed substantially more strongly in their position than the filaments located crosswise to the clamping direction or those located in the interior of the bores and of the cords of bristles. This is also clearly evidenced by the scars on these filaments that occur at the clamping points.

According to the invention, the prerequisite for the ability of these filaments to withstand the extreme tensile stresses at the moment of their least resistance is created by providing that the clamping direction of the bottom plate agrees with the direction of the reciprocal motion of the severing knife. As a result, when the severing knife is used in the course of the alternating reciprocating motions, the filaments located in the most strongly fixed outer positions in the cords of bristles are located on the front and rear side, respectively, of the cord of bristles and thus are capable in the alternating motions of presenting the greatest resistance to the tensile stresses of the knife.

For severing the cords of bristles, the invention uses a severing device known per se, which has an electric motor, a reducing gear, and an eccentric element, with which a reciprocating flat severing knife is driven. Once the tool is opened, the severing device is lowered centrally in the injection molding tool between the bristle fields and guide paths crosswise to the direction of motion of the severing knife.

The advantage of the version according to the invention is above all that with a single operation, on so the one hand finished brush products can leave the injection molding tool, while at the same time bristle fields fully prepared for the next injection molding operation protrude through the bores of the bottom plate to the requisite length into the mold interiors of the injection molding tool once the mold is closed, without requiring additional technologically complicated steps for follow-up of the bristle cords.

In the embodiment proposed, it is for instance possible for bristle materials of metal to be injected into the brush body as well. In the case of steel wire, of the kind used to make hand wire brushes and in which no pressing actions whatever are possible, the invention has made it possible to effectively prevent overshooting. Perfect adhesion of the wire sheaves that form the bristles in the brush body has been achieved.

BRIEF DESCRIPTION OF THE DRAWINGS

The invention will be described in further detail below in terms of an exemplary embodiment. In the associated drawings.

DESCRIPTION OF THE PREFERRED EMBODIMENTS

In the following example, as a plastic composition for producing hand washing brushes, polypropylene is used for the brush body and polyamide 6 is used for the bristle material.

Figure 1:
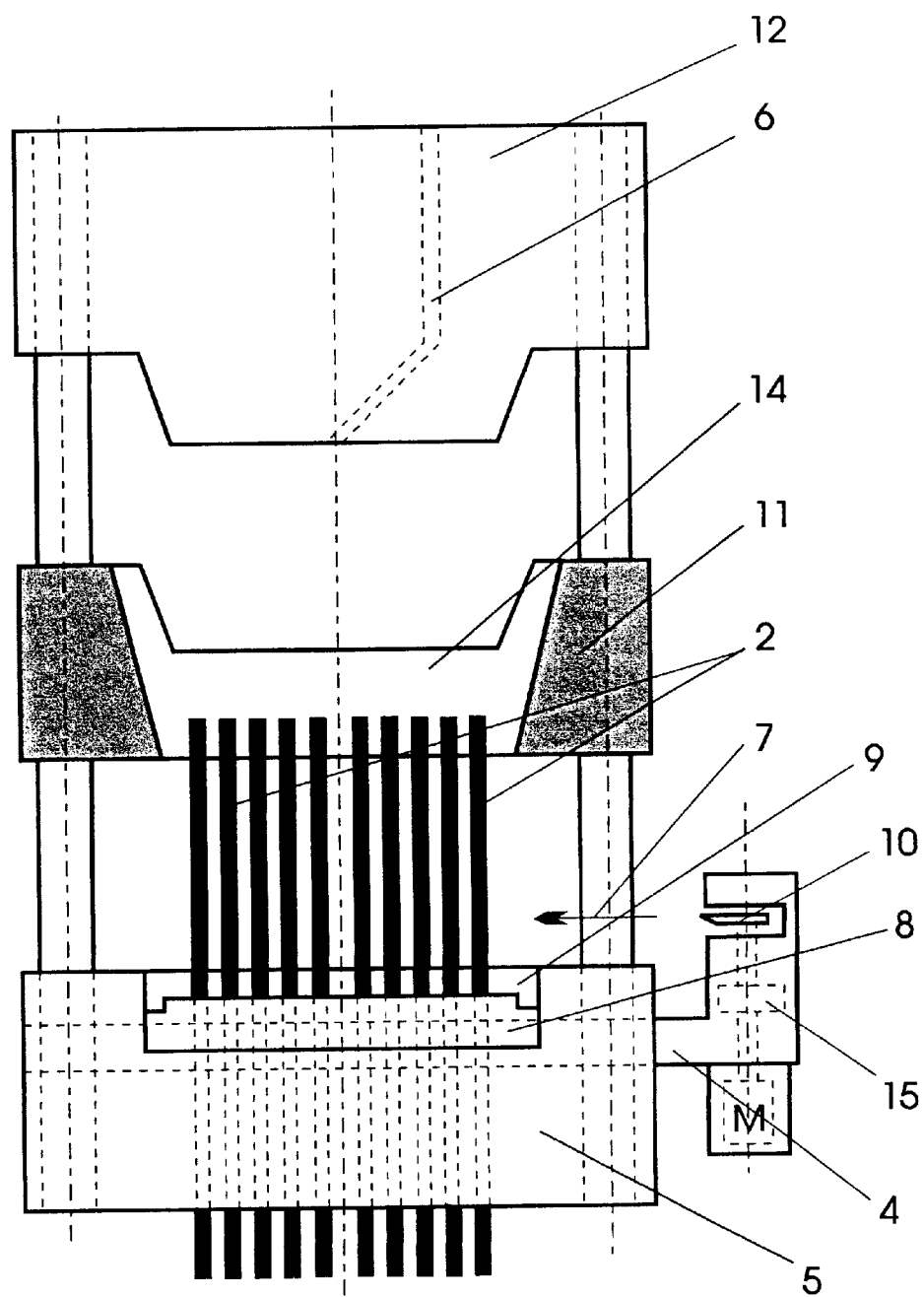
FIG. 1 shows a side view of an open injection molding tool, comprising a top part, bottom part and intermediate plate, with an integrated severing device.

The injection molding tool schematically shown in FIG. 1 is built into an injection molding machine in a known way and substantially comprises a base plate 5, intermediate plate 11, cover plate 12, and severing device 4, with a severing knife 10, the eccentric element 15, and a reducing gear.

The intermediate plate 11, which is integrated with the injection molding tool and with its internal contour forms the outer contour of the brush body 14, and the base plate 5 that receives the split bottom plates 8; 9 are disposed to be movable toward the cover plate 12.

Figure 2:
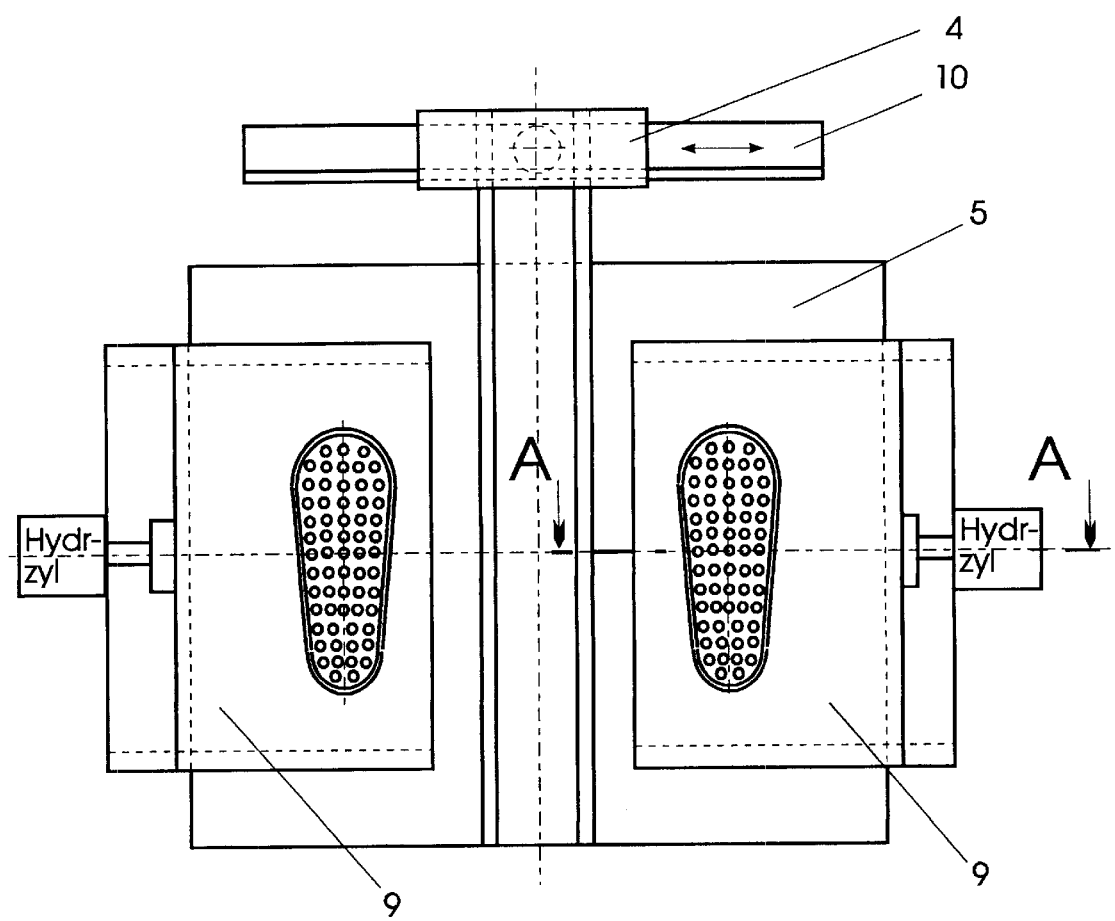
FIG. 2 is a plan view on the bottom part of the injection molding tool, which is equipped with two modules for producing handwashing brushes.
Figure 3:
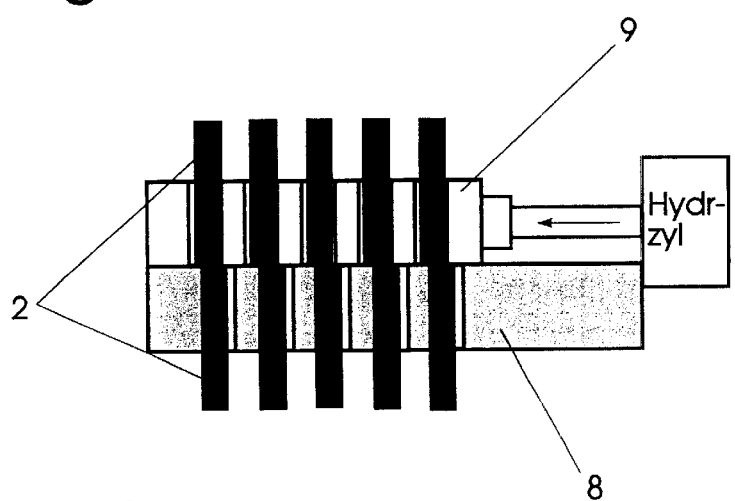
FIG. 3 shows the section A—A through the double plate of the bottom part in the position for clamping the cords of bristles.

The endless cords of bristles 3 are passed through the perforated bottom plates 8; 9 (FIG. 3), which comprise two plates that can be displaced relative to one another, and except for the phase of tool opening are clamped and protrude into the mold interior 1 (FIG. 2) to a length with which they are to be injected into the brush body 14.

Figure 4:
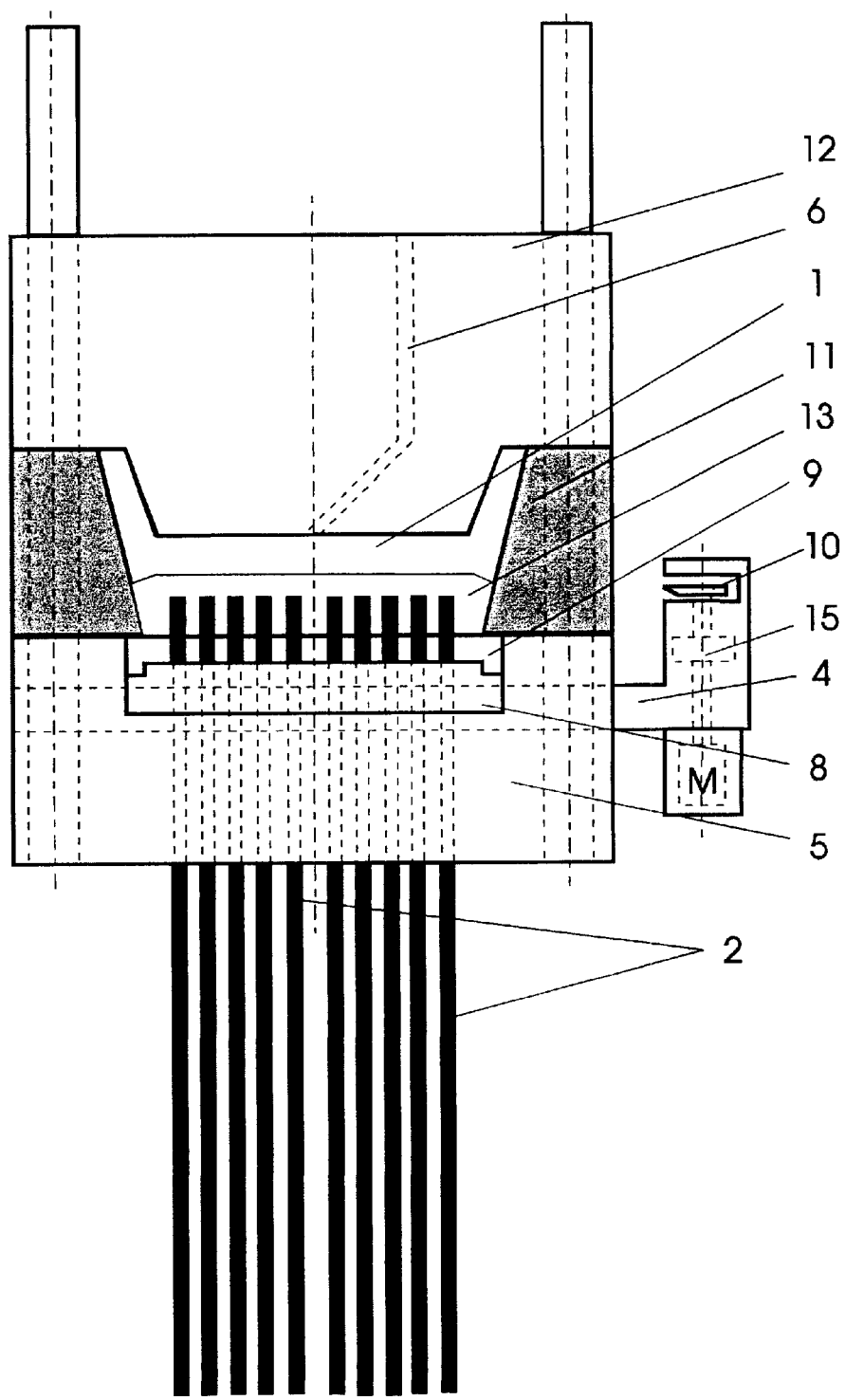
FIG. 4 shows the closed injection molding tool, with the material of the brush body introduced in the first injection stage for sealing the bores of the bottom plate of the injection mold.

In a first injection stage, with an injection pressure of approximately $1.5 \cdot 10^8$ Pa and an injection speed of 100 mm/s, a volume of plastic composition such that the plastic composition sheathes the perforated surface of the bottom plate 9, including the tips of the cords of bristles 2 that protrude into the mold interior 1, with plastic composition 13 (FIG. 4) but without completely filling the mold interior 1, is injected through the heating conduit 6 into the mold interior 1, this volume for instance being about 60% of the volume of the brush body 14.

In the ensuing stages, while avoiding the buildup of a head pressure in the mold interior 1, the injection speed is reduced, for instance to values of 30 mm/s, 10 mm/s, 4 mm/s, down to 2 mm/s in the last stage.

Once the injection molded brush body 14 has cooled down, the clamping of the cords of bristles 3 by the split bottom plate 8; 9 is undone, and while the injection molding tool is being opened, the brush body 14 is lifted gently by the intermediate plate 11 from the bottom plate 9 as far as is required for the bristle length for the finished bristle field and the bristle length for the bristle field to be injected into the next brush body.

In this opening operation, the cords of bristles 2 cast integrally into the brush body 14 and now firmly anchored in it are pulled through the split bottom plate 8; 9 and clamped again in this bottom plate once the fully open position of the injection molding tool is reached.

Between the brush body 14 and the bottom plate 8; 9, this creates a zone of rigidly tensed cords of bristles 2, which in the predetermined sectional plane 7 are cut off in the open from the cords of bristles 2 for the next product by the severing device 4, using a severing knife 10, in a cut to be performed without a counterpart blade.

The appropriate spacing of the sectional plane 7 of the severing knife 10 from the bottom plate 9 is determined by placing the sectional plane 7 at a distance from the bottom plate 9 that still allows the internal rigidity of the cords of bristles 2 to be utilized for the severing cut. In the example shown, for a thickness of the PA 6 filaments of 0.3 mm and a diameter of the cords of bristles 3 of 2.2 mm, a sectional plane 7 was fixed at a distance of 6.0 mm from the bottom plate 9.

The direction of motion of the bottom plates 8; 9, which have an influence on the degree of resistance of the filaments of the cords of bristles 2 to the forces, originating in the severing knife 10, that pull the bristle sheaves out of the injection molded brush body 14, matches the direction of the reciprocating motion of the severing knife 10.

By means of the embodiment according to the invention, decisive technological difficulties that until now have in principle stood in the way of the use of endless cords of bristles of plastic in the manufacture of brush products using injection molding tools by direct injection of the bristle sheaves into the brush body are overcome.

REFERENCE NUMERALS

1 Mold interior
2 Cords of bristles
4 Severing device
5 Base plate
6 Heating conduit
7 Sectional plane
8 Bottom plate
9 Bottom plate
10 Severing knife
11 Intermediate plate
12 Cover plate
13 Plastic composition
14 Brush body
15 Eccentric element

What is claimed is:

1. A method of producing brush products whose brush bodies are injection molded from plastic, comprising the steps of:

providing an injection molding tool comprising a base plate that supports a pair of split bottom plates, the pair of split bottom plates each including a plurality of bores and comprising an upper plate and a lower plate which can be displaced relative to one another, the injection molding tool further comprising an intermediate plate and the base plate with the pair of split bottom plates cooperatively define a portion of a mold interior;

providing a severing device comprising a flat knife that swings back and forth and which acts without a counter part blade, the severing device being incorporated as a component of the injection molding tool and being displaceable In a direction transverse to the back and forth swinging thereof;

introducing a plurality of endless cords of bristles into the bores of the bottom plates and into the mold interior;

injection, in a first injection stage, a plastic material into the mold interior such that the bores of the bottom plates as well as the portion of the cords of bristles extending into the mold interior are sealed, the first injection stage does not fulfill the mold interior; in a plurality of further injection stages, filling the mold interior with a plastic material, the further injection stages being differentiated in terms of pressure, speed and volume; after the conclusion of the final injection stage, displacing the intermediate plate relative to the base plate and bottom plates to an opening position after which the cords of bristles are clamped by the bottom plates, in the opening position the brush body is firmly held and the cords of bristles are rigidly tensed between the brush body and the upper one of the pair of split bottom plates; and wherein a cutting operation is subsequently performed by the severing device by displacing the flat knife along a sectional plane between the brush body and the upper one of the split bottom plates and swinging the flat blade back and forth in a direction transverse to the direction of displacement, the cutting operation being aided by a tension of the cords of bristles and an internal rigidity of the individual filaments thereof.

2. A method as defined in claim 1, wherein in the first injection stage the plastic material is injected into the mold interior at a speed of over 100 mm/s and a pressure of over $1.5 \times 10^8$ Pa.

3. A method as defined in claim 2, wherein for the cords of bristles, plastics having a higher flow temperature or crystalline melting temperature compared to a flow temperature or a crystalline melting temperature of the injection plastic material for the brush body are used.

4. A method as defined in claim 1, wherein in the further injection stages an injection pressure does not exceed $4 \times 10^7$ Pa.

5. A method as defined in claim 1, wherein between the first injection stage and the conclusion of the final injection stage there is a period of time of at least 2.5 seconds.

6. A method as defined in claim 1, wherein a temperature of the plastic material for the brush body is in ranges that are approximately 10° C. above a flow temperature or a crystalline melting temperature of a bristle material.

7. A method as defined in claim 1, wherein metal wires are used as a material of the bristles.

8. A method as defined in claim 1, wherein a cover plate of the injection molding tool is moved upwards in an opening motion, passed the intermediate plate, far enough that after a severing operation, a finished brush product is ejected from the intermediate plate by an ejector without difficulty and without leaving notches behind in a direction of the cover plate.

9. A method as defined in claim 1, wherein the cutting of the cords of bristles by the knife takes place at a spacing of the sectional plane from the bottom plates that is defined by a material quality of the cords and bristles, a thickness and number of filaments, and a length of fitting precision of a guidance in the bores of the bottom plates of the injection molding tool and amounts to approximately three times a diameter of the cords of bristles.

10. A device for producing brush products, comprising:

an injection molding tool comprising a base plate that supports a pair of split bottom plates, the pair of split bottom plates each including a plurality of bores and comprising an upper plate and a lower plate which can be displaced relative to one another for clamping cords of bristle material, the injection molding tool further comprising an intermediate plate, the intermediate plate and the base plate with the pair of split bottom plates cooperatively define a portion of a mold interior, the intermediate plate further being displaceable with respect to the base plate and bottom plates to an opening position; and a flat severing knife incorporated as a component of the injection molding tool, the severing knife being displaceable in a cutting direction for severing the cords of bristle material when the injection molding tool is in the opening position, the cords of bristle material being severed along a sectional plane between a formed brush body and the upper one of the pair of split bottom plates, the flat severing knife swinging back and forth in a direction transverse with respect to the direction of the displacement, the flat severing knife acting without a supporting cutting underlay and the cutting is further aided by a rigid tension applied to the cords of bristle material when the injection molding tool is in the opening position.

* * * * *